United States Patent
Sui et al.

(10) Patent No.: US 11,514,324 B2
(45) Date of Patent: Nov. 29, 2022

(54) METHODS OF OPTIMIZATION OF COMPUTATIONAL GRAPHS OF NEURAL NETWORKS

(71) Applicant: Xilinx, Inc., San Jose, CA (US)

(72) Inventors: Lingzhi Sui, Beijing (CN); Yushun Wang, Beijing (CN); Xin Liu, Beijing (CN)

(*) Notice: Subject to any disclaimer, the term of this patent is extended or adjusted under 35 U.S.C. 154(b) by 825 days.

(21) Appl. No.: 16/368,945

(22) Filed: Mar. 29, 2019

(65) Prior Publication Data

US 2019/0303762 A1   Oct. 3, 2019

(30) Foreign Application Priority Data

Mar. 30, 2018   (CN) .......................... 201810289195.4

(51) Int. Cl.
*G06N 3/08* (2006.01)
*G06N 3/04* (2006.01)

(52) U.S. Cl.
CPC .............. *G06N 3/082* (2013.01); *G06N 3/04* (2013.01)

(58) Field of Classification Search
None
See application file for complete search history.

(56) References Cited

U.S. PATENT DOCUMENTS

2019/0050715 A1 * 2/2019 Ooi ..................... G06K 9/6262

OTHER PUBLICATIONS

Alwani et al., Fused-Layer CNN Accelerators, IEEE 2016; Total pages: 12 (Year: 2016).*
Xilinx, 7 Series FPGAs Data Sheet: Overview, Product Specification, DS180 (v2.5) Aug. 1, 2017; pp. 18 (Year: 2017).*
Abdelouahab et al., Tactics To Directly Map CNN Graphs on Embedded FPGAs, arXiv:1712.04322v1 [cs.DC] Nov. 20, 2017; pp. 1-7 (Year: 2017).*
Guo et al., Angel-Eye: A Complete Design Flow for Mapping CNN Onto Embedded FPGA, IEEE Transactions on Computer-Aided Design of Integrated Circuits and Systems, vol. 37, No. 1, Jan. 2018; pp. 35-47 (Year: 2018).*
Ji et al., Bridging the Gap Between Neural Networks and Neuromorphic Hardware with A Neural Network Compiler, ASPLOS'18, Mar. 24-28, 2018; pp. 448-460 (Year: 2018).*

* cited by examiner

*Primary Examiner* — Alan Chen

(57) ABSTRACT

The present invention discloses a method to optimize a neural network computational graph. The computational graph is used for performing neural network calculation by a computational platform. The computational platform reads data needed by the calculation from off-chip memory. The method comprises: layers which can be fused are selected at least based on an optimization rule to reduce frequency of data exchange between the computational platform and the off-chip memory, carrying out fusion for at least two adjacent layers in the computational graph according to the selected layer objects. Here, the at least two adjacent layers are at least one of the following: horizontally adjacent layers having the same input of feature maps; and longitudinally adjacent layers in which the calculation results of a feature map of a previous layer are at least part of input for a next layer. The method to optimize a computational graph of the present invention can be automatically carried out based on rules or through isomorphic subgraph matching. Thus, an optimal reconstruction mode for executing the computational graph is found out, execution efficiency of the neural network computational platform is improved.

12 Claims, 15 Drawing Sheets

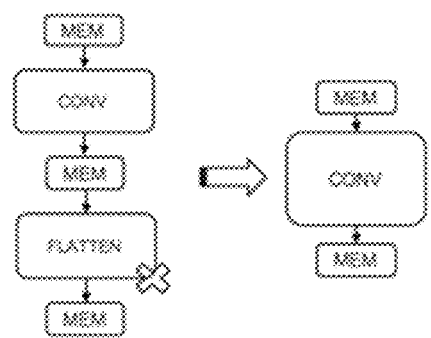 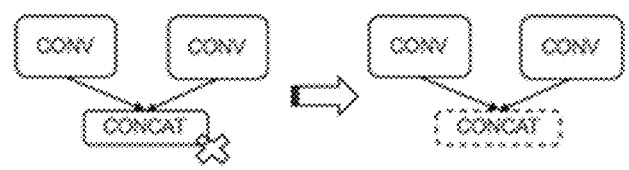
Fig. 8                    Fig. 9

METHODS OF OPTIMIZATION OF COMPUTATIONAL GRAPHS OF NEURAL NETWORKS

TECHNICAL FIELD

The present invention relates to the field of deep learning, particularly relates to a method to design a computational platform for neural network calculation and a computational system used for a neural network.

BACKGROUND

In recent years, neural networks (NNs) have become a research hot spot in image recognition domains. A neural network model achieved by training can be applied to fields such as image classification, object recognition, significance detection, etc. In recent years, there is a trend of increasing calculation scale and increasing complexity for neural network models, its practical requirements cannot be satisfied by traditional CPU platforms. Therefore, utilizing an FPGA, a GPU-based heterogeneous computational platform to design a neural network accelerator, has become a new research hot spot. Here, compared with a GPU platform, FPGA can achieve higher computation energy ratio, meanwhile, the characteristic that FPGA can be quickly iterated and can carry out hardware configurability, further better satisfies requirements of rapid development of algorithms.

Neural network algorithms from different deep learning frameworks are converted into a generic computational graph, the computational graph is optimized and reconstructed, then the optimized computational graph is mapped into instructions and machine codes of a hardware platform, thus, the compilation process of the algorithm on the hardware platform is finished. Because there exist limits caused by on-chip storage resources, bandwidth, computation resources, and hardware architectures, etc., and bit-width of custom instruction set architectures (ISA) on different hardware platforms, additionally, there also exist limits caused by factors such as various computation operations, dimension transformations, different parameters of computation operations, etc. in different deep learning frameworks, as a result, how to find out an optimal way to execute the computational graph during the algorithm-to-instruction mapping process, in other words, how to make the instructions generated by compiler from the algorithms to be efficiently executed on the hardware platform, is an important problem that needs to be solved when designing a computational platform.

Therefore, a method to improve the overall efficiency to execute the neural networks on a computational platform is still needed.

SUMMARY

In order to solve at least one of the above problems, the present invention provides a computational graph-level optimization method, which can: under the condition that there is no change for the calculation results of a bottom layer in the computational graph, through reasonable design of the computational graph, reduce data exchange between off-chip memory and on-chip buffer as much as possible by layer decomposition and operation fusion, to more effectively utilize the hardware resources.

According to an aspect of the present invention, a method to optimize a neural network computational graph is provided. The computational graph is used for the inference of neural networks on a computational platform. The computational platform reads data needed for inference from off-chip memory. The method comprises: layers are fused at least based on an optimization rule of reducing frequency of data exchange between the computational platform and the off-chip memory; at least two adjacent layers in the computational graph are fused according to the selected layer objects. Here, the at least two adjacent layers are at least one of the following: horizontally adjacent layers that share the same input feature maps; and longitudinally adjacent layers in which the calculation results of a feature map of a previous layer are at least part of the input for a next layer.

Preferably, at least two adjacent layers comprise: a convolution (CONV) layer, a non-linearity (ReLU) layer and a pooling (POOL) layer which are successive; horizontal CONV layers which share the same input of feature maps.

Preferably, the optimization method may further comprise: by changing the pattern of storing results to off-chip memory and/or loading results from external memory into a specific dimension arrangement manner, to prune layers which are only used for data dimension transformation. The pruned layers may comprise at least one of the following: a concatenation (CONCAT) layer; and a flattening (FLATTEN) layer.

Preferably, the optimization method may further comprise: a subsequent adjacent layer that further reads required data from other feature maps from the off-chip memory. The subsequent adjacent layer may be an element-wise add (ELTWISE) layer.

Preferably, the optimization method may further comprise: directly merging operation of a subsequent layer into a previous layer, here, the subsequent layer is a batch normalization (BatchNorm) layer and a scale (Scale) layer, the previous layer is a convolution (CONV) layer.

Preferably, the optimization method may further comprise: decomposing a layer with a plurality of previous horizontally side-by-side input feature maps; and merging the layers after the decomposition into respective input branches. A layer decomposed may be a pooling (POOL) layer on a trunk having branch inputs.

According to another aspect of the present invention, a rule-based optimization method for a neural network computational graph is provided, comprising: making preset rules according to any one of the above methods; searching a topology conforming the preset rules in the neural network computational graph and reconstructing the computational graph.

According to another aspect of the present invention, a method to automatically optimize a neural network computational graph is provided, comprising: analyzing the topology of the neural network to obtain a neural network computational graph; setting a subgraph template according to which we can perform layer fusion, here, the layer fusion is at least partially used for reducing frequency of data exchange with the off-chip memory; according to the preset rules, acquiring at least one subgraph matching strategy for the computational graph; and based on the subgraph matching strategy, reconstructing the computational graph to form a computational graph through layer fusion.

Preferably, the automatic optimization method may further comprise: screening the at least one subgraph matching strategy obtained to acquire an optimal subgraph matching strategy. The screening for the optimal subgraph matching strategy may carry out simulation for computational graphs each being reconstructed based on each subgraph matching strategy or based on an empirical formula to acquire performance result of computational graphs each being reconstructed by each subgraph matching strategy, selecting a subgraph matching strategy corresponding to the computational graph with optimal performance as an optimal subgraph matching strategy. Preferably, the optimal subgraph matching strategy can be selected according to time cost and/or calculation efficiency of a computational graph reconstructed based on a subgraph matching strategy.

The preset rules may comprise at least one of the following: a subgraph isomorphism matching rule; and a horizontal and/or longitudinal fusion rule.

Preferably, according to the preset rules, acquiring at least one subgraph matching strategy for the computational graph comprises: according to the preset rules, finding out at least one subgraph matching strategy which covers the computational graph maximally and does not have an intersection of layers.

Preferably, according to the preset rules, acquiring at least one subgraph matching strategy for the computational graph comprises: finding out a non-frequent subgraph conforming to the subgraph template in the computational graph; and carrying out subgraph template accurate matching of the computational graph based on the non-frequent subgraph.

Finding out the non-frequent subgraph can be at least based on an edge label of each edge and node occurrence frequency of the computational graph, the edge label comprises dependence relations between a feature map flowing along the edge and other operations.

Preferably, carrying out subgraph template accurate matching of the computational graph based on the non-frequent subgraph comprises: based on the non-frequent subgraph, determining a topology accurately matching the subgraph template in the computational graph according to breadth-first search in combination with pruning.

According to another aspect of the present invention, a computational platform for the inference of neural networks is provided, comprising: a data processing module, which is used to perform preset calculation processing for input data and generate output data; a data storage module, which is used for caching input data needed by the data processing module or intermediate data outputted by the data processing module; and a control module, which controls the data processing module and the data storage module to execute the inference of neural networks, based on the computational graph optimized by any one of the above methods.

According to an aspect of the present invention, a non-transitory machine-readable storage medium is provided, on which executable code is stored. When the executable code is executed by a processor of an electronic device, any one of the above methods is executed by the processor.

Through using the optimization method for a neural network computational graph provided by the present invention, neural network calculation can obtain the highest processing efficiency on a computational platform flexibly based on various limits. The optimization method of the present invention, through reconstructing the computational graph, by greatly reusing the shared input and/or intermediate data, avoids unnecessary bandwidth saturation. Through reasonable arrangement of storage and/or reading, time-consuming data rearrangement operation is pruned, and certain subsequent operations can be merged into a previous operation. Thus, various operations and I/O process are optimized in the implementations of neural networks, the overall calculation efficiency is improved. The computational graph-level optimization method of the present invention can be automatically carried out based on rules or through isomorphic subgraph matching. Thus, the optimal reconstruction mode for executing the computational graph can be automatically obtained, the execution efficiency of the neural network computational platform is improved. In addition, through free addition and modification of a subgraph template, the automatic optimization method of the present invention has better adaptability to various emerging network topologies.

BRIEF DESCRIPTION OF FIGURES

Through a more detailed description for embodiments disclosed herein with reference to the attached figures, the above and other objectives, characteristics, and advantages of the present disclosure are more obvious. Here, in the exemplary embodiments of the present disclosure, same reference number generally represents the same component.

FIG. 8 shows that a flattening (FLATTEN) operation is pruned, according to an embodiment of the present invention.

FIG. 9 shows that a concatenation (CONCAT) operation is pruned, according to an embodiment of the present invention.

DETAILED DESCRIPTION

Figure 1:
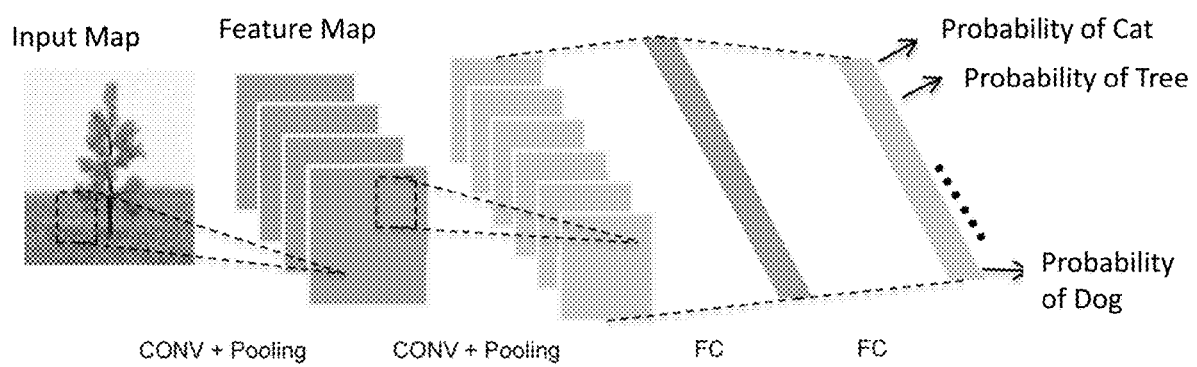
FIG. 1 shows a series of layers in a typical CNN model which are implemented orderly.

Preferred embodiments of the present disclosure will be described in more detail below with reference to the attached figures. Although the attached figures show preferred embodiments of the present disclosure, however, it should be understood that the present disclosure may be implemented in a variety of ways and should not be limited by the embodiments described herein. Rather, these embodiments are provided in order that the disclosure is more thorough and complete, and that the scope of the present disclosure can be completely conveyed to those skilled in the art.

Basic Concept of Neural Network Processor

In recent years, with continuous development of artificial intelligence, machine learning and neural network algorithms, convolutional neural networks have achieved beyond human performance in many domains such as image classification, recognition, detection, tracking, etc. Because a convolutional neural network has a characteristics that the number of parameters is huge and computational complexity is large, and because there is requirement of stability and high energy consumption for a hardware platform, utilizing a heterogeneous computational platform such as FPGA and GPU, etc. to carry out design for an accelerator becomes a new research hot point. Compared with a GPU platform, FPGA can obtain higher energy efficiency due to its low power consumption characteristic, meanwhile, the characteristic that FPGA can be quickly iterated and can perform hardware reconstruction, better satisfies requirements of high-speed development of algorithm. However, existing CNN accelerator design based on FPGA and GPU has problems such as that network topology supported is single, bandwidth utilization is not reasonable, calculation resource utilization efficiency is low, etc., can't satisfy higher and higher real-time requirement. As to heterogeneous accelerator design of CNN, there still exists a large research and exploration space.

Compared with a single computational platform (i.e., a computational platform only having a host or a CPU), what is aimed at by the present invention is a dedicated processor which is a specialized processor for implementing neural networks. It should be understood by those skilled in the art that the term "dedicated neural network processor" used in the application, may also be named as a "neural network processor" or a "NN processor" for short. Because deep learning is a most popular technology item in neural network technology, the neural network dedicated processor may be implemented as a deep learning dedicated processor or a deep learning processor. But, it should be understood by those skilled in the art that neural network has various technical branches such as deep neural network (DNN) and convolutional neural network (CNN), thus, the neural network dedicated processor can also be implemented as a deep neural network (CNN) dedicated processor or a deep neural network processor (a DNN processor or a CNN processor). In other words, implementation technology of a "deep learning processor" or a "deep neural network processor" in a heterogeneous computational platform for neural network computation is also within the scope of the present invention.

DPU (Deep-Learning Processing Unit) is a general acceleration platform for neural network algorithm in artificial intelligence, it utilizes the FPGA's characteristic of high parallelism degree and low power consumption to achieve inference based on a convolutional neural network (CNN). Here, the DPU may be considered as an embodiment of the above "deep learning processor" or "deep neural network processor". The description below will be mainly based on a DPU using CNN topology, which is implemented through FPGA, but it should be understood by those skilled in the art: the principle of the present invention is also applicable to a neural network processor which performs inference for other neural networks through hardware structure such as GPU.

In the process of mapping DPU platform algorithm to instructions, it is needed to decouple from deep learning framework, analyze various CNN algorithms, construct a computational graph topology to which the DPU corresponds, carry out coarse-grained graph-level optimization for the graph topology, comprising node pruning and fusion, finally form a subgraph and the configuration of the subgraph, so that generation of instructions of the DPU compiler is guided.

Because DPU is a general acceleration platform for neural network algorithm in artificial intelligence domains, it is needed to support fixed-point models from different platforms; meanwhile, DPU serves as a hardware IP (intellectual property), supports that hardware parameters can be configured so that deploying IP on different hardware platforms can be carried out. Therefore, during the process of mapping algorithm to instructions, it is needed to first analyze a network computational graph from different deep learning frameworks, and search the possibility of graph-level optimization, so that the maximization of hardware calculation efficiency is realized as possible. During the process when DPU performs the inference of neural networks and executes a computational graph, a plurality of operations can be executed on each node of the computational graph. The operations need to be implemented on the DPU, and can be understood as calling different computational modules on the DPU. In general, compared to the time cost of reading data needed for operation from off-chip memory, the time for executing calculation by the DPU is very short, so that reading from the storage becomes a bottleneck of the system processing capability. A computational graph-level optimization method on how to find a smaller and faster computational graph topology, not changing calculation results of a bottom layer in the graph, reducing frequency of data exchange between the storage and the chip as much as possible to more effectively utilize hardware resources, is a key step in the process to map DPU algorithm to instructions. The calculation implementation strategy of the present invention is a link part between the preceding part and the following part of deep learning algorithm and a DPU compiler, has an important function of leveraging cross-layer optimizations for neural networks, is a core algorithm in the front-end of the compiler.

In order to better illustrate the calculation strategy of the present invention, first, the basic concept of CNN, network computational graph and its basic operation contents are explained.

CNN Basic Concept

CNN achieves the state-of-the-art performance in extensive visual related tasks. In order to help understand computation operation in CNN analyzed in the application, first, the basic knowledge of CNN is introduced using an existing CNN model.

As shown in FIG. 1, a typical CNN is composed of a series of layers which operate orderly.

The parameters of a CNN model are called "weights". The first layer of CNN reads an input image and outputs a series of feature maps. A following layer reads the feature map generated by a previous layer and outputs new feature maps. A final classifier outputs the possibility that the input image may belong to a certain category. CONY layer (convolution layer) and FC layer (full-connecting layer) are two basic layer types in CNN. Usually, there are pooling layers after a CONV layer.

In the application, as to a CNN layer, $f^{in}_j$ represents a j-th input feature map, $f^{out}_i$ represents an i-th output feature map, bi represents an offset term of the i-th output map.

As to a CONV layer, $n_{in}$ and $n_{out}$ represent the number of input and output feature maps respectively.

As to a FC layer, $n_{in}$ and $n_{out}$ represent the length of the input and output feature vectors respectively.

CONV layers (convolution layers) are defined as follows: a CONV layer takes a series of feature maps as input, and obtains output feature maps through convolution kernel.

A non-linear layer, which is usually connected to a CONV layer, i.e., a non-linear activation function, is applied to each element in the output feature map. Relu function is usually used as the activation function, the layer is also usually referred as a ReLU layer.

CONV layer can be represented by formula 1:

$$f^{out}_i = \sum_{j=1}^{n_{in}} g_{i,j} \otimes +b_i (1 \leq i \leq n_{out}) \quad (1)$$

Here, $g_{i,j}$ is a convolution kernel which is applied to a j-th input feature map and an i-th output feature map. FC layers (fully-connected layers) are defined as: a linear transformation of applying a FC layer to an input feature:

$$f^{out} = W f^{in} + b \quad (2)$$

W is a $n_{out} \times n_{in}$ transformation matrix, b is a bias term. It should be noted that: as to a FC layer, the input is not a combination of several two-dimensional feature maps, instead, is a feature. Therefore, in the formula 2, the parameters $n_{in}$ and $n_{out}$ actually correspond to the length of the input and output feature vectors.

Pooling layer: It is usually connected to a CONV layer for outputting the maximum value or the average value of each subarea in each feature map. The maximum value of the pooling can be represented by formula 3:

$$f^{out}_{i,j} = \max_{p \times p} \begin{pmatrix} f^{in}_{m,n} & \cdots & f^{in}_{m,n+p-1} \\ \vdots & & \vdots \\ f^{in}_{m+p-1,n} & \cdots & f^{in}_{m+p-1,n+p-1} \end{pmatrix} \quad (3)$$

Here, p is the size of the pooling kernel. The nonlinear "downsampling" not only reduces the size of a feature map and computation complexity for a next layer, but also provides a translation invariance. CNN can be used to perform image classification in the forward process of inference.

Basic Concept of Network Computational Graph

In order to be decoupled from a deep learning computational framework, it is needed to construct a computational graph topology corresponding to a neural network processor. Neural network algorithms from different deep learning frameworks are converted into a generic computational graph, the computational graph is optimized and reconstructed, then the optimized computational graph is mapped into instructions and machine codes for a hardware platform, thus, the compilation process of the algorithm on the hardware platform is finished. Because there are limits of storage resources, bandwidth, calculation resources, hardware features, etc., and bit-width of custom instruction set architectures (ISA) on different hardware platforms, there are also limits of factors such as computation operations, dimension transformations, different parameters of computation operations in different deep learning frameworks, how to find an optimal way to execute a computational graph in the process to map an algorithm to instructions, in other words, how to make the instructions generated by compiler from the algorithms can be efficiently executed on a hardware platform, is an important problem needs to be solved to design a computational platform.

Figure 2A:
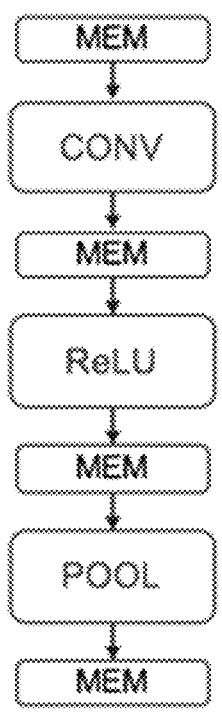
FIG. 2A-FIG. 2C show typical topologies of the computational graphs of existing CNN models.
Figure 2B:
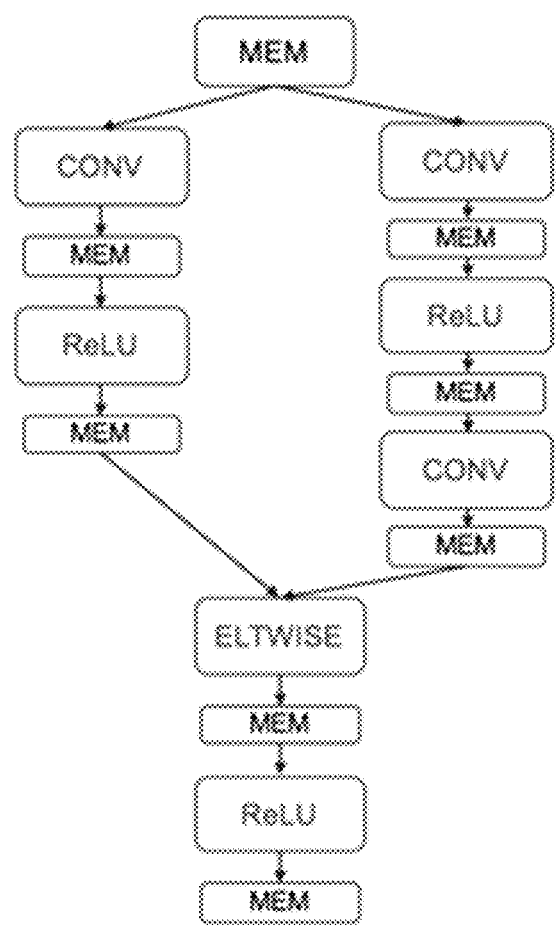
Figure 2C:
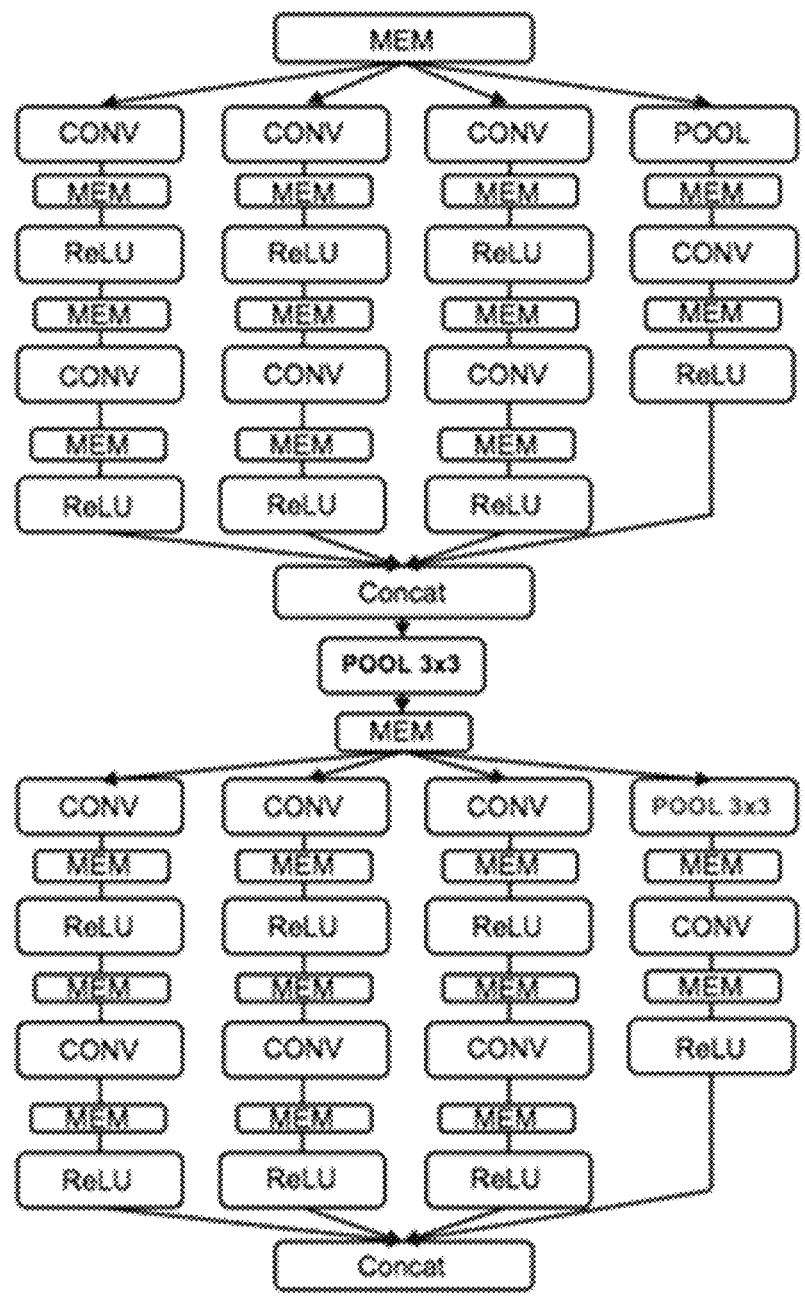

FIG. 2A-FIG. 2C show typical network computational graph topologies of existing CNN networks. Because the present invention is involved in reducing frequency of data exchange between off-chip memory and on-chip buffer through optimization and reconstruction of a computational graph, therefore, storage access operation is added in a conventional computational graph topology which only includes computation operation nodes, in other words, reading operation for the storage, which is represented by "MEM", is added in the graph, to show that: compared with the prior art, the technical strategy of the present invention has advantage that the bandwidth is saved. In the realization of DPU, "MEM" refers to data exchange operation between a DDR (double-rate synchronous dynamic random access memory) and on-chip buffer.

FIG. 2A shows a basic topology of a VGG network. As shown in FIG. 2A, when a network computational graph without branches executes CONV (convolution operation), ReLU (non-linear operation, the activation function used is generally a ReLU function) and POOL (pooling operation) which are most basic, because a feature map required to be loaded is too large, it is needed to frequently transfer data between a DDR and on-chip buffer (for example, implemented as BRAM, namely, block RAM). FIG. 2B shows a basic topology in a ResNet network, FIG. 2C shows adjacent inceptions topology in GoogleNet v1. As shown in FIG. 2B and FIG. 2C, a network computational graph having branches introduces an element-wise add (ELTWISE) layer which is used for adding and merging a plurality of convolution layers, and a concatenation (CONCAT) layer which is used to concatenate data from each input layer along the dimension of channel to form a new layer. Similarly, the network computational graph in the figure still shows that it is needed to frequently transfer data between the DDR and the BRAM. It should be understood that the above listed "Vgg", "ResNet" and "GoogleNet" are popular CNN architecture in the prior art, and are used to illustrate, not to limit, the principle of the present invention.

Optimization Based on Data Reuse

Because there is limit of storage resource on a chip, the whole CNN calculation cannot be completed at one time on the chip, the calculation task needs to be divided in a way of partition. The data loaded on the chip after partition can be used for many times in a way of reusing, so that the communication amount with off-chip memory unit is reduced.

Figure 3:
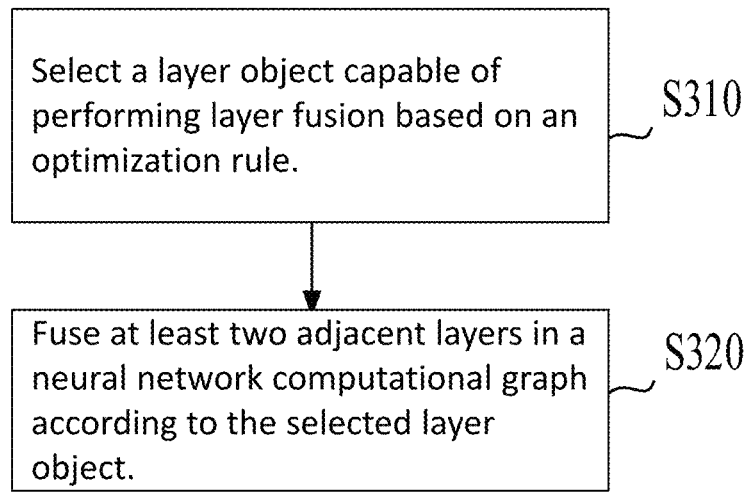
FIG. 3 shows a flow chart of a method to optimize a neural network computational graph according to an embodiment of the present invention.

Below, the computational graph-level optimization method of the present invention is described with reference to FIG. 3. FIG. 3 shows a method to optimize a neural network computational graph according to an embodiment of the present invention. A computational platform involved in the present invention needs to read needed data, such as an image that needs to be classified, from off-chip memory. Correspondingly, the data read and the intermediate calculation result of each operation can be temporarily stored in on-chip buffer.

In step S310, layers which can be fused are selected based on an optimization rule. The above optimization rule is at least based on the consideration of reducing frequency of data exchange between a computational platform and off-chip memory.

According to an embodiment, the above optimization rule may also be made based on limits of storage resources, bandwidth, computational resources, hardware design, etc.

and bit-width of custom instruction set architectures (ISA) on different hardware platform chips, and based on factors such as computation operation, dimension transformation, and changes of parameters of computation operation of different deep learning frameworks.

Subsequently, in step S320, at least two adjacent layers in the computational graph are fused according to the selected layer objects. At least two adjacent layers may be horizontally adjacent layers with the same input of feature maps, and/or longitudinally adjacent layers where output feature maps of a previous layer are at least part of the input of a next layer.

Figure 4:
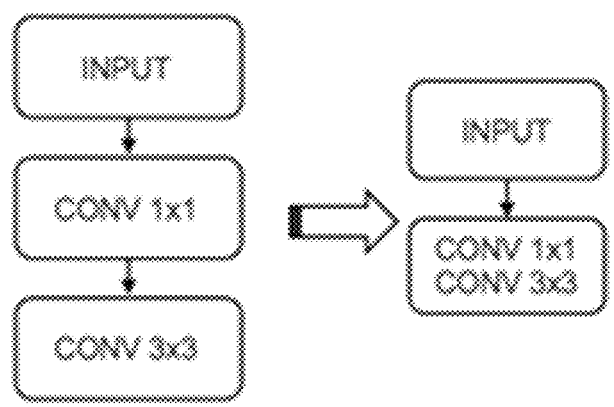
FIG. 4 shows an example of longitudinal fusion of convolutions according to an embodiment of the present invention.
Figure 5:
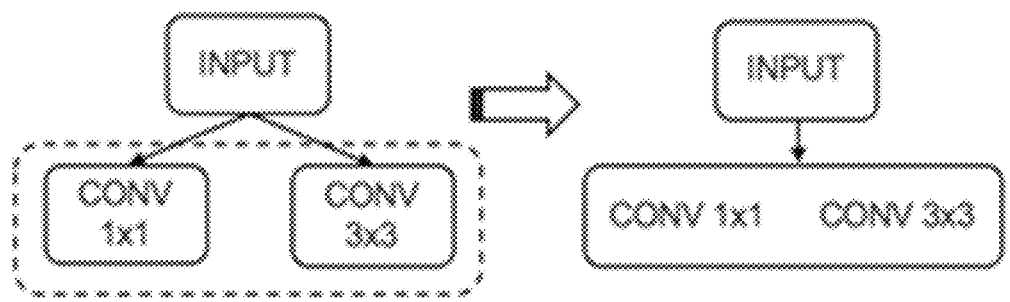
FIG. 5 shows an example of horizontal fusion of convolutions according to an embodiment of the present invention.

As to the most basic CONV layer in a CNN computational graph, the computational graph-level optimization method of the present invention can perform fusion for CONV layers having different structural relations. FIG. 4 shows longitudinal fusion of convolutions according to an embodiment of the present invention. The longitudinal layers of two successive convolution operations are fused, all needed parameters can be loaded into on-chip buffer at one time, thus, the two convolution operations are fused. The intermediate result between the two operations does not need to be written back to off-chip memory, instead, is directly cached on the chip, and is written back after the calculation is finished. FIG. 5 shows horizontal fusion of convolutions according to an embodiment of the present invention. The horizontal layer fusion can be understood as several operations sharing a same input feature map, it may not be needed to load a feature map on the chip for each layer, instead, be written back to corresponding position of the off-chip memory respectively after calculation is directly finished on the chip.

Figure 6:
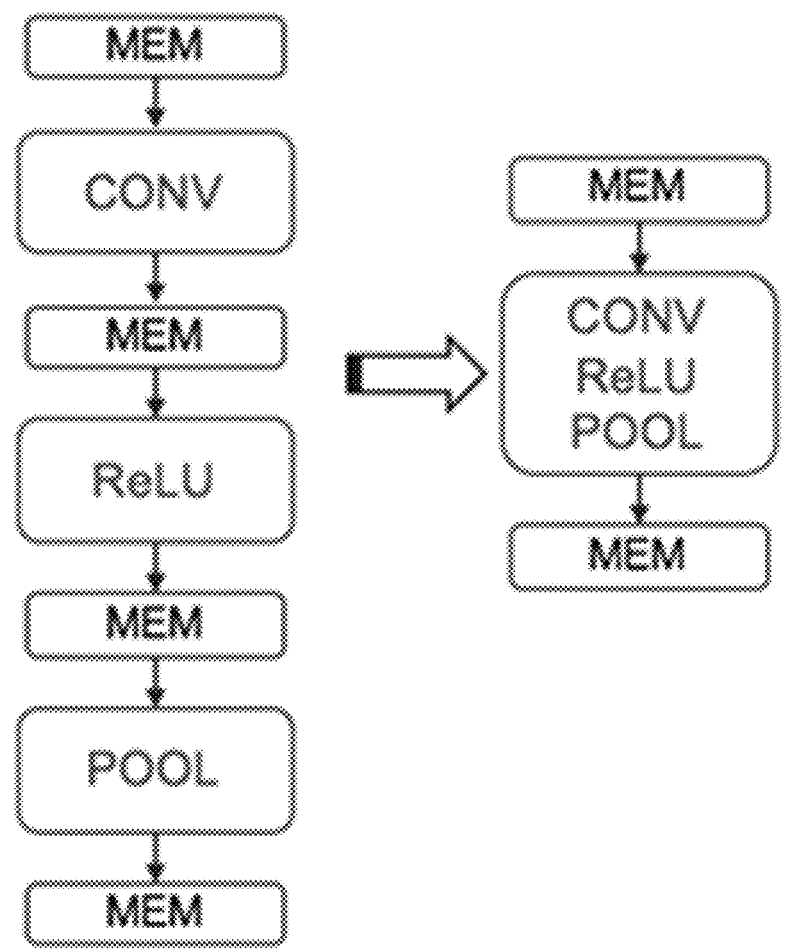
FIG. 6 shows a naive network computational graph and an optimized network computational graph based on the present invention for a basic unit in VGG.

Below, the principle that the layer fusion operation of the present invention is capable of improving execution efficiency is described in detail with reference to FIG. 6. FIG. 6 shows a network computational graph of a Vgg basic topology, the left side is an existing topology, the right side is a topology optimized based on the present invention. In the same way, the "MEM" in the figure refers to storage reading operation, at the right side, CONV, ReLU and POOL operations which are combined in one layer indicate that the inter-layer operations only relate to on-chip buffer, and does not relate to occupation of bandwidth (i.e., doesn't relate to data exchange with off-chip memory).

Usually, in the execution process of the whole computational graph, data storage manner in hardware may be abstracted as one dimensional vector, which is unfolded by a feature map which has three dimensions: width, height, and channel, and a fourth dimension: selectable batch, according to a certain rule. For example, when image classification is performed, not only the original image can be abstracted into a three-dimensional feature map, the output (that is, the operation result of each node) of each operation after the operation is finished can still be named as a feature map. Because storage resources on the chip are limited, for example, BRAM on the chip cannot cache a complete feature map at one time, thus, to finish a certain operation of the whole feature map, multiple readings from a DDR to a BRAM are needed.

Assume that the input feature map is a two-dimensional image with three-channel (for example, RGB), BRAM on the chip can read data of one channel at one time. In the existing topology shown in the left side of FIG. 6, to finish CONV, ReLU and POOL operations for the input feature map needs first reading, for example, three-channel data of an left upper image block from off-chip memory (for example, DDR), storing back to the DDR after CONV operation is carried out, then reading three-channel data of a right upper image block and storing back to the DDR after CONV operation is carried out, then reading three-channel data of a left lower image block and storing back to the DDR after CONV operation is carried out, finally reading three-channel data of a left lower image block and storing back to the DDR after CONV operation is carried out. Thus, CONV operation for the feature map is finished. Then, reading three-channel data of the left upper image block which has been processed by CONV operation from the DDR and storing back to the DDR after ReLU operation is carried out, reading three-channel data of the right upper image block has been processed by CONV operation from the DDR and storing back to the DDR after ReLU operation is carried out, then reading three-channel data of the left lower image block which has been processed by CONV operation from the DDR and storing back to the DDR after ReLU operation is carried out, finally reading three-channel data of the right lower image block which has been processed by CONV operation from the DDR and storing back to the DDR after ReLU operation is carried out. Thus, ReLU operation for the feature map is finished. Finally, reading three-channel data of the left upper image block which has been processed by ReLU operation from the DDR and storing back to the DDR after POOL operation is carried out, reading three-channel data of the right upper image block which has been processed by ReLU operation from the DDR and storing back to the DDR after POOL operation is carried out, then reading three-channel data of the left lower image block which has been processed by ReLU operation and storing back to the DDR after POOL operation is carried out, finally reading three-channel data of the right lower image block which has been processed by ReLU operation from the DDR and storing back to the DDR after POOL operation is carried out. Thus, POOL operation for the feature map is finished.

In the layer fusion topology based on the present invention at the right side of FIG. 6, in a same way, to finish CONV, ReLU and POOL operations for the input feature map, first, three-channel data of the left upper image block is read from the DDR, CONV operation is carried out, then storing at on-chip buffer (for example, BRAM) is carried out, ReLU operation for the data cached on the chip is directly carried out, after necessary chip caching, POOL operation is directly carried out, then three-channel data of the left upper image block which has been processed by CONV, ReLU and POOL operations are stored back to the DDR. Then, three-channel data of the right upper image block is read from the DDR, in a same way, CONV, ReLU and POOL operations are directly carried out on-chip buffer, then, storing back to the DDR is carried out. Then, the three-channel data of the left lower image block is read from the DDR, in a same way, CONV, ReLU and POOL operations are directly carried out on the chip, then storing back to the DDR is carried out. Finally, the three-channel data of the right lower image block is read from the DDR, in a same way, CONV, ReLU and POOL operations are directly carried out on-chip buffer, then, storing back to DDR is carried out.

Therefore, the method to design a computational platform of the present invention can greatly reduce reading frequency from off-chip memory to on-chip buffer, to solve a problem that off-chip memory reading is the bottleneck of efficiency of DPU, so that the task execution efficiency of DPU is greatly improved. It should be understood that in order to illustrate the principle of the present invention, a feature map is divided into four blocks: left upper block, upper right block, left lower block, and right lower block for processing and storing. In practical application, the feature map can be divided in a different way according to requirement, there is no limit.

In the example of FIG. 6, at least two adjacent layers comprise three adjacent layers, namely, successive convolution (CONV) layer, non-linear (ReLU) layer and POOL layer. This is the most common basic topology in CNN. Here, the subsequent layers (namely, ReLU and POOL layer) at least need complete calculation result of the previous layer (CONV layer) to finish all operations.

In addition to that layer fusion can be performed for the successive layers of a single branch shown above, in other embodiments, optimization and reconstruction can be performed for other topologies in a computational graph.

Figure 7:
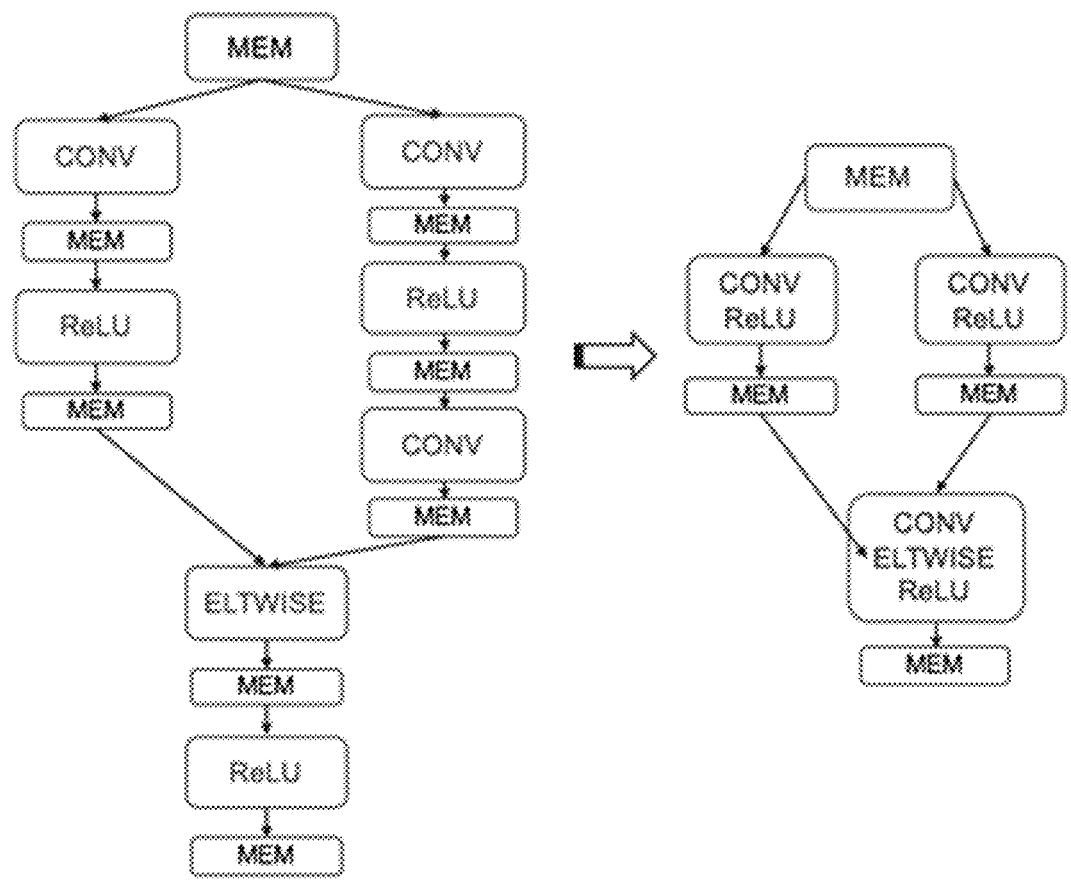
FIG. 7 shows a naïve network computational graph and an optimized network computational graph based on the present invention for a basic unit in ResNet.

FIG. 7 shows a network computational graph of a ResNet basic topology, the left side is an existing topology, and the right side is a topology optimized based on the present invention.

As shown in the right side of FIG. 7, in addition to that fusion is performed for CONV layer and ReLU layer, in a network topology having branches, the optimization method of the present invention can be applied to nodes with two or more inputs (such as element-wise add (ELTWISE) layer in the figure). Therefore, the optimization method of the present invention may further comprise that subsequent adjacent layers read needed data of other feature maps from the off-chip memory. Here, the element-wise add (ELTWISE) layer serving as a first subsequent layer reuses result data of the CONV layer from the right side of the network, in addition, receives the result data of CONV and ReLU layer of the left side of the network as input. Therefore, data reuse level is further improved through optimization of the computational graph topology.

As mentioned above, in the execution process for the whole computational graph, the way how data is stored in hardware can be abstracted into a one-dimensional data tensor which is formed by unfolding the feature map according to a certain rule, thus, as to operations which doesn't change data value and which only changes data dimension or arrange mode, deleting from the computational graph can be carried out through pruning. Different from GPU and CPU which specially rearrange data in hardware, fusion into computation operation of related layers for processing can be carried out by the optimization method of the present invention, for example, in operation of a previous computational graph node, the data is directly stored in off-chip memory (e.g., DDR) according to an arrangement mode of converted dimension; storing can also be carried out in a general way, and LOAD is performed according to a new dimension for a next computational graph node, so that the influence of special data rearrangement and dimension transformation is eliminated, and execution efficiency of hardware is improved. Other operations which have no influence on needed calculation result can be deleted through pruning.

FIG. 8 shows that a FLATTEN layer is pruned according to an embodiment of the present invention. FIG. 9 shows that a CONCAT (concatenation) layer is pruned according to an embodiment of the present invention. Because a concatenation layer relates to merging of network branches, marking in the graph is needed. Dashed box outside the CONCAT represents that in the implementation strategy of the present invention, dimension transformation involved in the operation of the concatenation layer is fused in the storing process of the operation result of the CONV layer described above.

Here, the operation of a FLATTEN layer is to carry out "flattening" for a feature map which has been processed by single convolution, namely, one-dimensional processing. In a network having branches (e.g., GoogleNet), as to concatenation operation of multiple layers, the output of which previous layers have multiple layers is connected to the input of the CONCAT. The operation of the CONCAT layer refers to forming a new layer through concatenating the data of each input layer into a new layer according to channel, then outputting to a next layer. Operations of the FLATTEN layer and the CONCAT layer are operations for special data rearrangement and dimension transformation, can be pruned through specific rules of storing data and/or reading mode.

Figure 10:
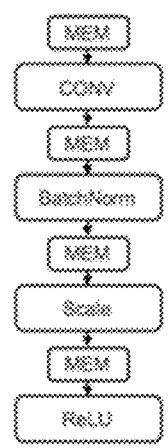
FIG. 10 shows the fusion of batch normalization (BatchNorm) and scale (Scale) operations, according to an embodiment of the present invention.

FIG. 10 shows that a BatchNorm (batch normalization) layer and a Scale layer is fused, according to an embodiment of the present invention. In the calculation process, the BatchNorm layer and the Scale layer can directly merge operations and parameters into a previous CONV layer.

In order to improve execution efficiency of the computational platform more effectively by improving data reuse level, in addition to layer fusion strategy shown above, layer decomposition operation can be performed.

Figure 11:
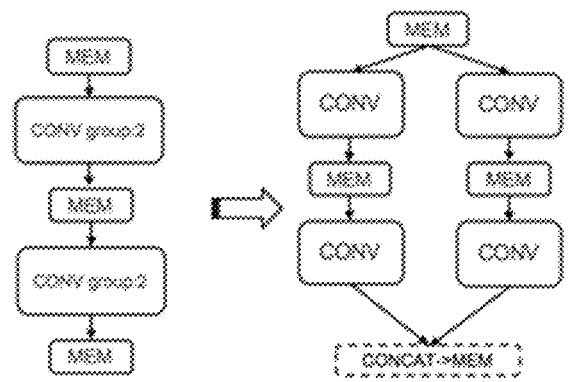
FIG. 11 shows an example of grouping operation according to an embodiment of the present invention.

In order to achieve forward compatibility capability of the optimization method of the present invention, the optimization method of the present invention can comprise decomposition for an existing complete CONV layer. FIG. 11 shows an example of grouping operation according to an embodiment of the present invention. Under the condition that there is limit for hardware processing capability, etc., grouping processing can be carried out for layers, the number of the parameters and computational complexity are reduced by setting group parameters. The implementation strategy of the present invention still can split convolution with group parameters into several small convolutions and then concatenating together is carried out, thus, universality of hardware is expanded.

In another embodiment, the optimization method of the present invention can further comprise: decomposing a layer which input comprises previous plurality of horizontal side-by-side feature maps; and merging layers after the decomposition into respective input branches. In other words, the decomposed layer can be a node of a trunk or limb in a network computational graph having branches, (i.e., a node located on a trunk which is connected with branches). In other words, a layer to be decomposed originally needs to receive inputs from a plurality of feature maps, but the plurality of layers after the decomposition can be merged into each branch respectively to perform single branch fusion. Preferably, a decomposed layer is a POOL layer on a trunk with branch inputs. It is emphasized that a layer which can be decomposed does not need to be a node connected with branches in an original computational graph (because CONCAT layer used for concatenation can be pruned), instead, can be a subsequent node after a concatenation layer on a trunk.

Figure 12:
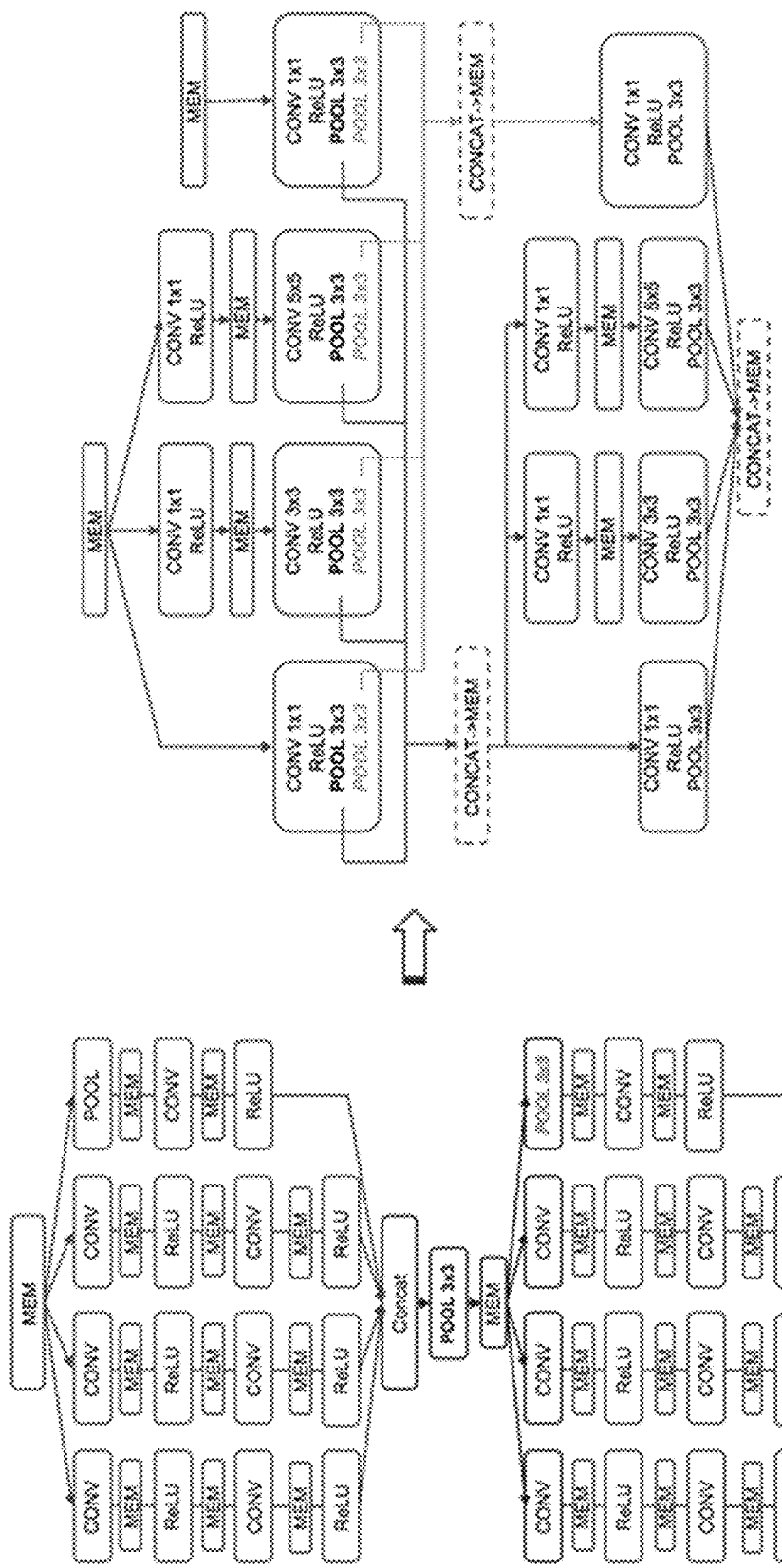
FIG. 12 shows an existing adjacent inception topology in a GoogleNet v1, and adjacent inceptions topology in a GoogleNet v1 optimized based on the present invention.
Figure 13:
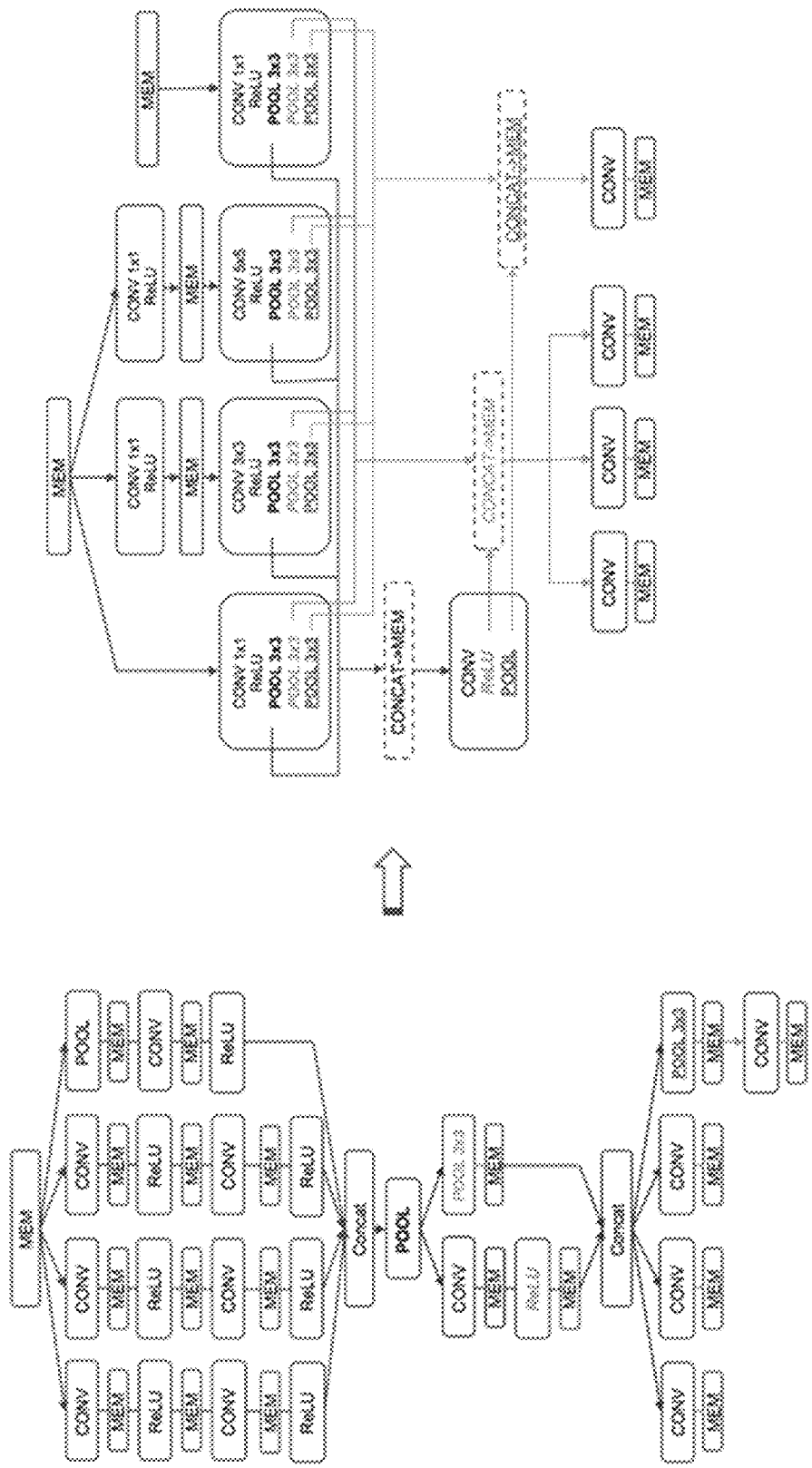
FIG. 13 shows an existing adjacent inception topology in a GoogleNet v2, and adjacent inceptions topology in a GoogleNet v2 optimized based on the present invention.

FIG. 12 and FIG. 13 show an optimized topology of a typical topology in GoogleNet after application of the data reuse strategy based on the present invention, here, FIG. 12 shows adjacent inceptions topology in a GoogleNet v1, FIG. 13 shows adjacent inceptions topology in a GoogleNet v2, an original topology is shown on the left side of each figure, and the optimal topology according to the method of the present invention is shown on the right side. Similarly, a dotted line frame outside CONCAT→MEM represents that in the implementation strategy of the present invention, dimension transformation involved in concatenation operation is fused in storing process of the CONV operation described above. In addition, in order to facilitate understanding, "italicized" format and "underline" format are used for distinguishing a plurality of successive operations and related operations with a same name.

Concretely, the graph not only relates to fusion of basic topologies, namely, successive convolution (CONV) operation, non-linear (ReLU) operation and pooling (POOL) operation, but also comprises layer decomposition operation. For example, carrying out concatenating and then pooling operation for result of a plurality of convolution operations, is equivalent to calculation result of directly pooling each convolution and then carrying out concatenating operation. Thus, pooling operation can be fused into each convolution operation respectively before concatenating operation, so that partial reconstitution and optimization of the computational graph are achieved.

Therefore, based on the optimization rule of the present invention, on the basis that there is limit of existing cache capacity of a chip, frequency of reading from off-chip memory is reduced by splitting a feature map into a plurality of data parts and performing horizontal and/or longitudinal layer reusing. It is obvious that result of performing reusing operation for each divided data part is equivalent to operation result of performing calculation of each layer according to a sequence of the feature map. In the operation process of each fusion layer of each data part, generated intermediate data is directly cached on on-chip buffer. In the process of above plurality of operations for the same part of data, writing data to off-chip memory is not involved, and data reading from the off-chip memory is usually not involved (exception is shown by element-wise add (ELTWISE) operation of FIG. 7).

The optimization method for a neural network computational graph of the present invention has been described above with reference to FIG. 3-FIG. 13. Based on related rules of the method, the computational graph can be optimized on the whole.

Figure 14:
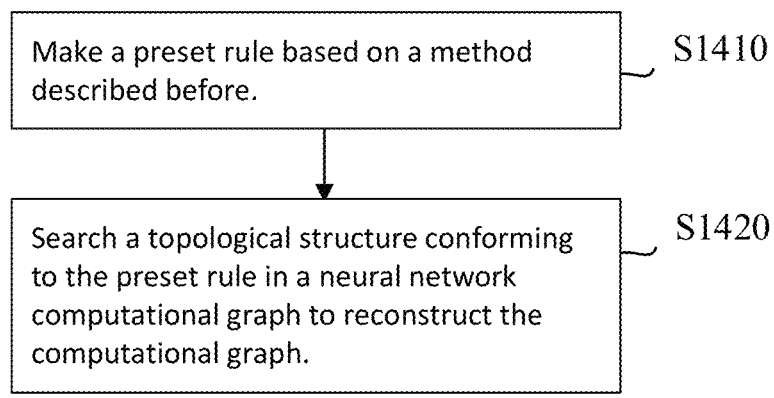
FIG. 14 shows a flow chart of a rule-based neural network optimization method according to an embodiment of the present invention.

FIG. 14 shows a flowchart of a method to optimize a neural network computational graph based on a subgraph according to an embodiment of the present invention.

In step S1410, the preset rules are made.

In step S1420, search a topology conforming to the preset rules in the neural network computational graph and reconstruct the computational graph.

Here, the preset rules may be a rule described in the computational graph-level optimization method described above with reference to FIG. 3-FIG. 13, for example, that successive CONV layer, ReLU layer and POOL layer are fused into a CONV-ReLU-POOL layer can serve as a rule, and the original successive CONV layer, ReLU layer and POOL layer in the computational graph are replaced.

The computational graph-level optimization method based on subgraph described above can be regarded as a rule-based reconstruction mode for a graph. The rule-based reconstruction mode can be regarded as a summary of various neural network topology topologies mentioned above. For example, in an early neural network topology such as Vgg, YOLO, DenseBox type, the network does not comprise a complex topology and computation operation, therefore, after convolution layer, search whether non-linear and pooling operation exist or not, if exist, automatically merge into the convolution operation, obtain a fused CONV-ReLU-POOL layer. In GoogleNet, there are many repeated inception topologies (as shown in FIG. 12 and FIG. 13), therefore, in each inception topology, as to several layers sharing an input feature map after concatenation operation, merging according to horizontal fusion rule can be carried out. In addition, may search whether there exists a pooling layer after concatenation operation. Because the effect of that pooling operation is carried out after concatenation operation, is the same as the effect of that concatenation operation is carried out after pooling operation, thus, the pooling operation can be decomposed, the pooling layers after the decomposition are respectively merged into a plurality of previous convolution operations which are connected with the concatenation operation. In a ResNet network, Res topology (for example, as shown in FIG. 7) keeps occurring, if an element-wise add (ELTWISE) layer is met, a layer which output result is dependent by only one operation and which is in element-wise add (ELTWISE)S input can be automatically searched, the element-wise add (ELTWISE) is fused in the layer. Facing a computational graph, the rule-based reconstruction mode can determine whether the preset rules are met (for example, subgraph made based on the rule) through exploring previous layers or next layers of each layer of network, then inter-layer fusion is carried out.

The rule-based reconstruction mode above can be carried out manually, or can be carried out automatically based on the rule. When there is a new network acceleration requirement, a layer or a special topology which occurs frequently can be found out manually, once the special topology appears in a network, decomposition and reconstruction is carried out, then a computational graph is formed through abstraction and optimization.

Although the rule-based mode described above can deal with reconstruction requirement of an existing simple network, there exists a lot of defects. Firstly, when the network topologies of different deep learning frameworks are analyzed, some platforms do not have the concept of computational graph, and some are computational graphs with finer granularity, the nodes in the graph are not all computation operations of a neural network. Because the rule-based reconstruction mode performs type determination only for adjacent layers, which is equivalent to carrying out breadth-first searching upwards or downwards, when the number of stages of searching is increased or a fusion rule is added for a layer, development difficulty and time cost can be caused. Secondly, if a special topology is met, errors of result can even be caused after layer fusion. The iteration speed for neural network topology and algorithm is very fast, when a brand new network is met, if linkage expansion is not carried out for the existing rule, adapting to the development of the algorithm and full utilization of the acceleration capability of hardware are very difficult.

In view of the above, in an embodiment, the present invention provides an automatic optimization method for a neural network computational graph. The method can be an automatic heuristic algorithm, firstly, a graph mining mode is used to find out a subgraph (preferably, a non-frequent subgraph) of a preset template, accurate matching of the subgraph templates is carried out, then based on a certain rule and topology of the neural network, all possible neural network layer fusion strategies are enumerated in a self-adaptive mode. As to a plurality of fusion strategies found out, through obtaining time cost of the preset template and finding out the optimal solution, the enumerated fused hypergraph can also be run in a simulator to measure actual performance, so that the optimal solution is obtained.

Figure 15:
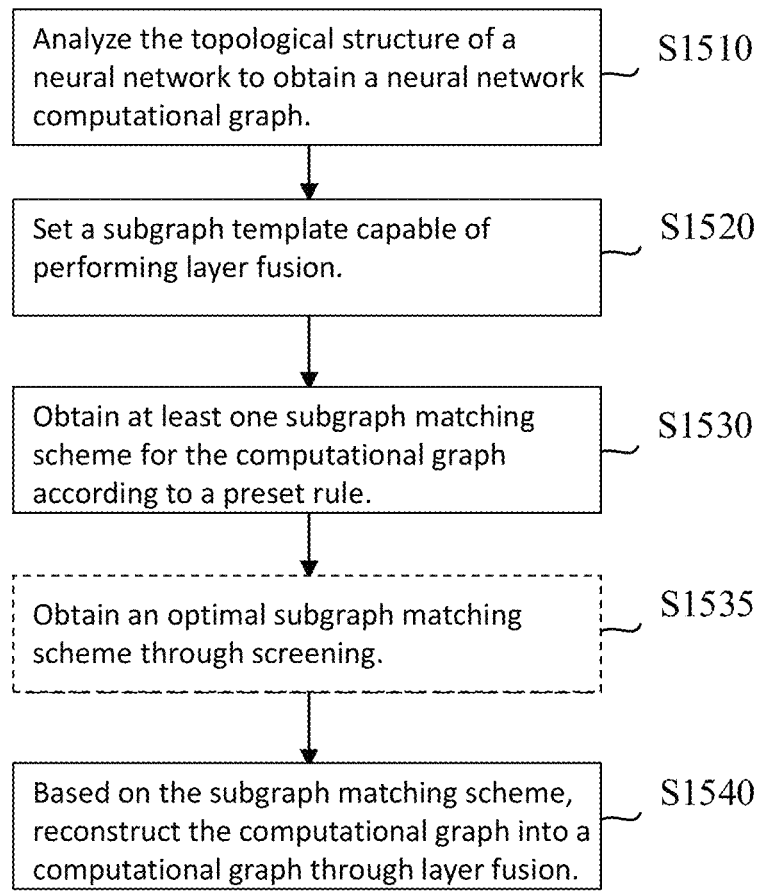
FIG. 15 shows a flow chart of an automatic method to optimize a neural network, according to an embodiment of the present invention.

FIG. 15 shows a flow chart of an automatic optimization method for a neural network computational graph according to an embodiment of the present invention. The method can automatically perform subgraph matching in a way of graph mining.

In step S1510, the topology of the neural network is analyzed to obtain a neural network computational graph.

Here, the computational graph obtained through analysis is preferably a generic computational graph in neural network field, a computational graph as shown in FIG. 12 and FIG. 13 which uses nodes to represent computation operation type of coarse granularity and does not comprise MEM nodes. In the automatic optimization method, a computational graph which does not have "MEM" nodes is preferably used, thus, unnecessary nodes in the graph are pruned to improve efficiency of graph mining. In addition, although what is shown in each figure is, for example, a coarse particle size computational graph in which an independent CONV operation is a node, the automatic matching strategy can also be applied to other granularities (e.g., finer granularity) and other neural network computational graphs.

For example, in a general neural network computational graph of Caffe, a CONV node comprises related multiplication and addition operations. But in a general neural network computational graph of TensorFlow, CONV operation and related multiplication and addition operations are respectively comprised in different nodes. Therefore, compared with a Caffe computational graph with coarse particle size, the particle size of a TensorFlow computational graph is finer. The automatic optimization method of the present invention can be flexibly adapted to neural network computational graphs with different granularities by freely setting subgraphs.

The acquired neural network computational graph is characterized by the calculation type of each node, for example, CONV layer (or node), ReLU layer (or node), etc. Therefore, automatic optimization of the whole graph can be achieved through subgraph matching of the most basic node types.

In a preferred embodiment, each node may also comprise a node label. The node label comprises the computation operation type and operation parameters of the node, such as the size of the convolution kernel in convolution operation, pooling type and size of the step length in pooling operation, etc. The feature map may be regarded as flowing along each edge in a computational graph, the label of each edge in the graph can indicate whether the flowing feature map is also depended by other computation operation, or whether be put together with feature maps generated by other computation operations to form an input feature map of a next computation operation.

In step S1520, a subgraph template capable of performing layer fusion is set. In an embodiment, at least part of the purpose of layer fusion is to reduce frequency of data exchange with off-chip memory. Therefore, a layer fusion template which is made according to experience and based on the rule-based reconstruction mode described above with reference to FIG. 3-FIG. 14, is abstracted into a computation subgraph, forming a query. Each time when a new topology is met, a subgraph is constructed and added into the inquiry list.

In step S1530, according to the preset rules, at least one subgraph matching strategy for the computational graph is obtained. In step S1540, based on the subgraph matching strategy, the computational graph is reconstructed to form a computational graph through layer fusion.

When the number of the subgraph matching strategies obtained in step S1530 exceeds one, the optimization method may further comprise a screening step. Thus, in an optional step S1535, obtain an optimal subgraph matching strategy through screening the obtained subgraph matching strategies which is at least more than one. The screening of the optimal subgraph matching strategy can be: carrying out simulation for a computational graph reconstructed based on each subgraph matching strategy, or based on an empirical formula, obtaining performance result of a computational graph which is reconstructed based on each subgraph matching strategy, selecting a subgraph matching strategy corresponding to a computational graph with the optimal performance as an optimal subgraph matching strategy. Here, the optimal subgraph matching strategy can be selected based on time cost and/or calculation efficiency of a computational graph reconstructed by a subgraph matching strategy.

In step S1530, the preset rules may comprise at least one of the following: a subgraph isomorphism matching rule; and a horizontal and/or longitudinal fusion rule. When the horizontal and longitudinal layers are fused, any multiple adjacent layers can be fused, therefore, template setting can't be carried out. At this time, the horizontal and longitudinal layer fusions can be regarded as an independent rule outside the subgraph template, as supplement for subgraph isomorphism matching. Because a subgraph template is usually a good verified experience model, thus, the priority of subgraph matching is usually higher than that of horizontal and longitudinal layer fusion rules. In addition, although the horizontal and longitudinal layer fusion cannot be abstracted into a subgraph template, but still can be regarded as a subgraph based on the layer fused by the above rule.

In an embodiment, the subgraph matching is: completely matching a template with a small part or several small parts of a computational graph, then fusing the matched parts together. Then, another template is matched with the computational graph, and so on. the computational graph obtained has a part which has been covered by the template. As to those parts which are not covered by the template, horizontal and longitudinal fusion can be performed after then, as to those layers which are not covered by the horizontal and longitudinal fusion, separate operation is carried out. Therefore, thousands of different execution modes can be obtained for the computational graph. As to these execution modes, sum can be obtained through simulation operation or empirical formula, an optimal reconstruction mode can be selected based on time cost and/or calculation efficiency of the reconstructed computational graph.

In an embodiment, at least one subgraph matching strategy which maximizes coverage of the computational graph and does not have an intersection of layers can be found out. Preferably, the maximum coverage can be a complete coverage.

In an embodiment, the number of matching times can be greatly reduced by introducing a non-frequent subgraph. Therefore, obtaining at least one subgraph matching strategy for a computational graph may comprise: finding out a non-frequent subgraph in the subgraphs conforming to the subgraph template in the computational graph; and carrying out accurate subgraph template matching for the computational graph based on the non-frequent subgraph. The non-frequent subgraphs are found out at least based on the edge label of each edge and node occurrence frequency of the computational graph, the edge label comprise dependence relation between a feature map flowing on the edge and other operations. Preferably, because a node with the largest label in the computational graph is a CONV node, the convolution node in the computational graph can be excluded firstly (that is, the convolution node cannot be a non-frequent node), then, the node with the lowest frequency in the subgraph where all convolution nodes are excluded is found out as a non-frequent node. Preferably, subgraph template accurate matching of a computational graph based on the non-frequent subgraph can be carried out according to breadth-first search in combination with pruning.

Accurate matching of a subgraph template for a computational graph based on a non-frequent subgraph according to breadth-first search in combination with pruning can be carried out as follows. Firstly, node types comprised in the subgraph template is determined. For example, the subgraph module comprises a template 1 and a template 2, here, the template 1 comprises CONV, ReLU and POOL nodes, the template 2 comprises CONV and element-wise add (ELTWISE) nodes. Then, the node types comprised in the computational graph to be reconstructed is determined. For example, a computational graph G comprises CONV, ReLU, POOL, and element-wise add (ELTWISE) nodes. Thus, the node types in the computational graph G can be sorted according to the number of times of occurrence, for example, element-wise add (ELTWISE)<POOL<CONV. Therefore, when matching is carried out, as to the template 1, POOL node with the lowest occurrence frequency in the template 1 is selected to match with a certain POOL node in the computational graph, then whether an adjacent node of the matched POOL node in the computational graph can be matched with other nodes in the template is determined. If the node is matched, other matching nodes are searched continuously. If there is no match, the POOL node, and the subsequent nodes and edges connected with the node in the computational graph, are pruned. For the same reason, as to the template 2, an element-wise add (ELTWISE) node with the lowest frequency in the graph G is selected, searching and pruning are carried out based on matching of the element-wise add (ELTWISE) node.

Below, the automatic optimization method is described with reference to concrete application examples.

APPLICATION EXAMPLES

Firstly, the topology of a neural network is analyzed, and is abstracted into a computational graph. In a neural network, a computational graph is a directed acyclic graph, each node is a computation operation in the neural network. Node label is set, the label comprises computational operation type and operation parameters of the node, for example, the size of the convolution kernel of the convolution operation, the pooling type and the size of the step length of the pooling operation, etc. A feature map may be viewed as flowing along each edge in a computational graph, each node in the graph comprises an edge label used for indicating whether the feature map flowing along the edge is further dependent on by other computation operations, or whether is put together with the feature maps generated by other computation operations to form an input feature map for a next computation operation.

Then, a layer fusion template made according to experience based on the rule-based reconstruction mode described above can be abstracted into a computational subgraph, forming a query. When a new topology is met, a subgraph is added into the query list. Thus, the problem of computational graph-level optimization reconstruction is converted as: carrying out a query comprising a plurality of subgraph topologies for a large tree-shaped directed acyclic graph. In other words, accurate subgraph matching is carried out for each subgraph topology in the query in a large computational graph.

Thus, the original computational graph analyzed from a neural network can be set as G, here, the set of all the nodes is named as U, the set of all edges is named as E, represents the number of nodes, $|E|$ represents the number of edges, a single node is represented as ui ($1<=i<=|U|$), a single edge is named as ei ($1<=i<=|E|$), the query for the set of subgraphs to be matched is represented as Q, here, each subgraph topology is represented as Qi, the set of all nodes in Qi is represented as V, the set of all edges is represented as B, a single node and edge are respectively represented as vi ($1<=i<=|V|$), bi ($1<=i<=|B|$). l (ui) and l (ei) represent a label for a node and a label for an edge.

Because in a neural network, generally, a non-frequent node in a subgraph is usually regarded as a non-frequent node in G. A hypergraph comprising the non-frequent node is also a non-frequent hypergraph, so that the number of times of matching can be greatly reduced. Therefore, first, search a non-frequent subgraph in each Qi. In order to optimize the searching for the non-frequent subgraph, convolution nodes can be removed firstly. This is because in general, in G, which has maximum $|l(ui)|$, which is convolution operation, therefore, in the process of selecting non-frequent subgraph in Qi, a single convolution node is generally not comprised. The criteria to judge a non-frequent subgraph in Qi can be, for example, sorting node occurrence frequency in the Qi, after exclusion of convolution nodes is chosen, nodes with the minimum occurrence frequency and their edges, are regarded as non-frequent subgraphs, in other words, MIN ($|l(vi)|$) and l(vi)!=Convolution, and is represented as vc.

Then all nodes in the G are traversed to find out l (ui)=l (vc), the set of the ui conforming to this condition is represented as Candidate (G), namely, C (G), Write ci∈C (G), f(vc)=ci, f represents that there exists a matching relation between them. Then, accurate matching of other nodes and edges in Qi is carried out. On the basis of the non-frequent subgraph, adding edge can be carried out for vc in Qi according to breadth-first sequence, and then the same breadth-first search is carried out for ci, if the edge adjacent to ci does not match the corresponding position in Qi, then this branch will be pruned. By using the way of breadth-first searching plus pruning, if a topology completely matched with the Qi can't be found at ci, then ci is deleted from C(G), if there exists a completely matched hypergraph, these layers are recorded as layers capable of fusion, and is represented as C(Qi).

In addition to subgraph isomorphism matching, horizontal fusion of layers and longitudinal fusion of layers can be used as an important supplement rule for computational graph-level optimization. Horizontal fusion means that several computational operations share a same input feature map, the bandwidth resource of transferring data from off-chip memory to a chip can be saved, longitudinal fusion means that the bandwidth required for transferring data of inter-layer feature maps back and forth between off-chip memory and a chip can be saved. This is an adaptive mode, because there are limits of computational resources and storage resources of different hardware platforms, thus, fusion modes can also be different. Layers capable of performing horizontal fusion and longitudinal fusion obtained under the limits, are recorded, and represented as C(T).

At this time, all layers which can be fused and fusion modes are recorded in C(Qi) and C(T), C(Qi) and C(T) usually comprises a plurality of layers, which can be used by different layer fusion modes, calculation efficiencies of instructions generated by different fusion modes on hardware platform are also different. At this time, a series of layer fusion modes need to be found out, so that the full coverage of the original large scale computational graph can be realized, and there is no intersection of layers. Because the optimization objective is a global optimal solution, meanwhile, in the application, the forward transmission can also be used for a plurality of times, but compiling only needs to be executed once, thus, time cost of compiling is not mostly required to be considered, thus, enumeration mode can be used here, according to an original computational graph, all possible layer fusion strategies are fetched sequentially from C(Qi) and C(T) to perform coverage, once an intersection of layers is met, it is regarded as two strategies, calculation efficiencies are measured respectively. Calculation efficiency, for example, can use cycle-accurate performance simulator, to simulate instructions generated by each layer fusion mode, calculate calculation efficiency and time cost of the layer fusion mode, and so on, when full coverage for the computational graph is achieved, the sum of the time cost is calculated, and a fusion mode with the shortest time cost in all strategies is obtained through comparison, and is used as final output. As to fact that the size of a feature map, the convolution kernel size of each computation operation and the number of channels, etc. can influence the efficiency of the instructions, the optimization method of the present invention can find out optimal layer fusion mode in a self-adaptive mode, namely, an optimal instruction under the current situation. In addition, as to computation operation which is not covered by the layer fusion template in the original computational graph, corresponding instructions for this layer can be separately generated in order to achieve full coverage.

Figure 16:
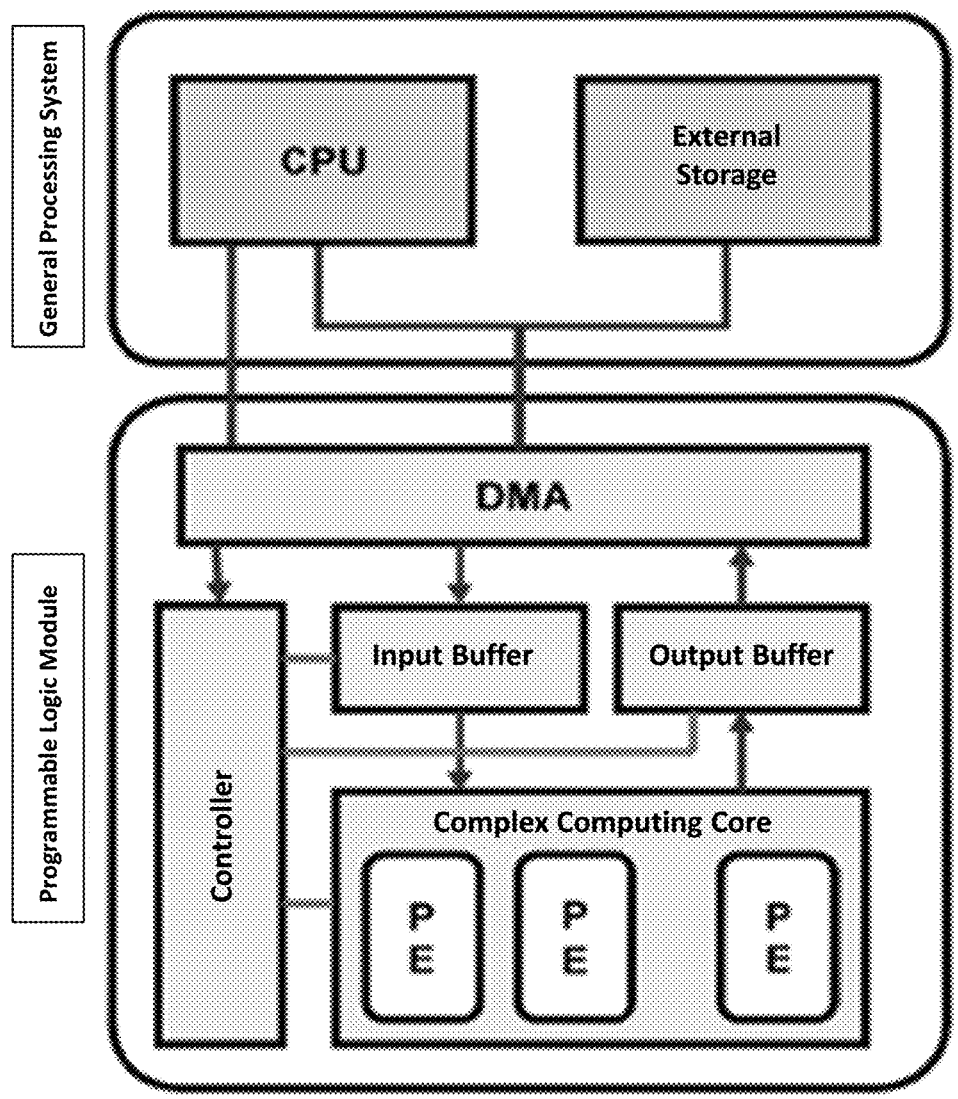
FIG. 16 shows an example of SoC which can be used to design the computational system of the present invention.

Therefore, through a heuristic strategy is further provided in the present invention, high efficient automatic isomorphic subgraph matching can be realized, and the possibilities of all potential layer fusions are searched in a self-adaptive mode. The strategy is open, through a performance simulator in cooperation with instructions, an optimal solution of layer fusion can be automatically found by just adding a template of a subgraph In the neural network computational implementation system of the present invention, part or all of the functions of a computational executing device used to execute neural network calculation can be realized by a digital circuit. In an embodiment, the computational system of the present invention may comprise a general processor, a storage, and a system on a chip (SOC) implemented with digital circuit. FIG. 16 shows an example which can be used for realizing SOC of an inference system of the present invention.

In an embodiment, the part of digital circuit (e.g., FPGA, GPU, or ASIC) of SOC can be used to realize a learning network required by the present system, such as a convolutional neural network. A computational executing device can be a high-parallel computational device based on FPGA or a GPU. Because CNN performs parallel calculation, thus, realization of the calculation function of convolutional neural network through logic hardware, especially FPGA, has natural calculation advantage, compared with software execution, lower power consumption can be achieved.

In an embodiment, all parameters related to CNN obtained by pre-training can be stored in off-chip memory, after then, when neural network calculation is carried out, according to the strategy of layer fusion and decomposition of the present invention, according to the computational graph after optimization and reconstruction (for example, the optimization method described by the computational graphs at right sides of FIG. 12 and FIG. 13, and subsequently in combination with FIG. 14 and FIG. 15), through maximization of data reuse between operations, data exchange between a main storage and on-chip buffer is reduced, so that system efficiency is improved.

Figure 17:
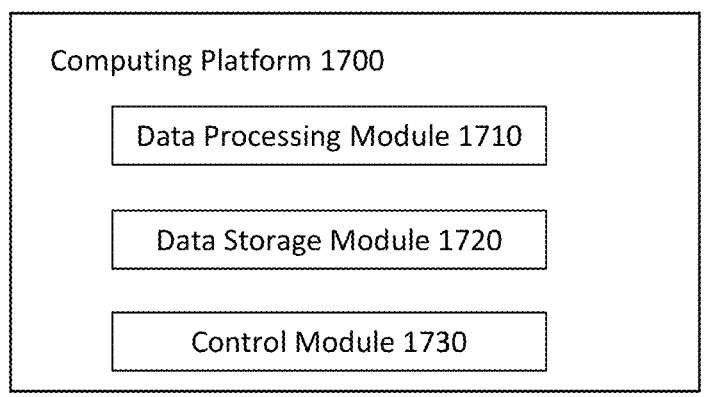
FIG. 17 shows a computational platform used for neural network according to an embodiment of the present invention.

FIG. 17 shows a computational platform for a neural network according to the present invention. The computational platform 1700 may comprise a data processing module 1710, a data storage module 1720, and a control module 1730.

The data processing module 1710 can be used to perform predetermined calculation processing for input data and generate output data. The data storage module 1720 can be used to cache input data needed by the data processing module or intermediate data outputted by the data processing module. The control module 1730 can control the data processing module 1710 and the data storage module 1720 to execute the inference of neural networks based on a computational graph which is optimized according to any of the methods described above. In an embodiment, the specific architecture of a computational platform of the present invention can be realized by, for example, a programmable logic module shown in FIG. 16, here, the data processing module 1710 corresponds to a complex computational core for executing CNN inference operation, the data storage module 1720 corresponds to an input/output buffer, and the control module 1730 corresponds to the controller in the figure.

The method to optimize a neural network computational graph according to the present invention has been described in detail above with reference to the attached figures. Through carrying out decomposition, merge and reconstruction for a computational graph, an optimized computational graph, which is equivalent to the previous computational graph and has optimal execution efficiency for the hardware platform, is formed, so that the whole execution efficiency of the hardware platform is improved.

In addition, the method of the present invention can be implemented as a computer program or a computer program product, the computer program or computer program product comprises computer program code instructions for executing the steps defined in the above methods of the present invention.

Or, the present invention may also be implemented as a non-transitory machine-readable storage medium (or a computer readable storage medium, or a machine-readable storage medium), on which an executable code (or a computer program, or a computer instruction code) is stored, when the executable code (or a computer program, or a computer instruction code) is executed by a processor of an electronic equipment (or a computational equipment, a server, etc.), the processor executes the steps of the above method according to the present invention.

Those skilled in the art will also understand that the various exemplary logic blocks, modules, circuits and algorithm steps described in combination with the disclosure herein can be implemented as electronic hardware, computer software or a combination of the two.

The flow charts and the block diagrams in the attached figures show possibly implemented system architecture, function and operation of system and method of a plurality of embodiments according to the present invention. At this point, each block in the flowchart or block diagram may represent a module, program segment, or a part of code, the module, the program segment, or the part of code comprises one or more executable instructions used for achieving specified logical function. It should also be noted that in some alternative implementations, the function marked in the block can also occur in a sequence different from the sequence marked in the figure. For example, two consecutive blocks may be executed basically in parallel, sometimes they can be executed in an opposite sequence, this is determined according to functions involved. It is also noted that each block in the block diagrams and/or flow diagrams, and combination of blocks in the block diagrams and/or flow diagrams, can be realized by a special hardware-based system which carries out specified functions or operations, or can be realized by combination of dedicated hardware and computer instructions.

In addition, the "first", "second" used in the present invention is intended to indicate different objects, not to limit execution order, for example, "first part of data" and "second part of data" is intended to indicate different parts belonging to a feature map. "first subsequent operation" and "second subsequent operation" are only used for distinguishing that the two subsequent operations are different subsequent operations.

Various embodiments of the present invention have been described above, the above description is exemplary, not exhaustive, and is not limited to the disclosed embodiments. Without departing from the scope and spirit of the described embodiments, many changes and modifications are apparent to those having ordinary skills in the art. The selection of the terms used herein is intended to best explain the principles of the various embodiments, practical application, technical improvement for market, or make the various embodiments disclosed herein can be understood by those having ordinary skills in the art.

What is claimed is:

1. A method to optimize a neural network computational graph, wherein the computational graph is used to execute neural network calculation by a computational platform; wherein the computational platform reads data needed by the calculation from off-chip memory, wherein the method comprises:
   selecting layers which can be fused at least based on an optimization rule to reduce frequency of data exchange between the computational platform and the off-chip memory;
   fusing at least two adjacent layers in the computational graph according to the selected layers, wherein the at least two adjacent layers are at least one of the following:
   horizontally adjacent layers having same input of feature maps,
   longitudinally adjacent layers, wherein the calculation results of a feature map of a previous layer are at least part of input for a next layer,
   wherein input data for the at least two adjacent layers is divided into M non-overlapping input data blocks (input data blocks (i), i=1, . . . , M), wherein M is an integer greater than 1, and
   wherein for i=1, . . . , M, one value of i at a time, (A) the input data block (i) is read from the off-chip memory into the computational platform, (B) the at least two adjacent layers calculate using the read input data block (i) resulting in output data block (i) on the computational platform, and (C) the resulting output data block (i) is stored back to the off-chip memory.

2. The method of claim 1, wherein the at least two adjacent layers comprise:
   a convolution (CONV) layer, a non-linear (ReLU) layer and a pooling (POOL) layer which are successive; horizontal CONV layers sharing same input of feature maps.

3. The method of claim 1, further comprising:
   pruning layers only used to change data dimension or arrangement manner in the neural network, through storing operation result back to the off-chip memory in a required dimension arrangement manner and/or reading previous operation result from the off-chip memory in a required dimension arrangement manner.

4. The method of claim 3, wherein the pruned layers comprise at least one of the following:
   a concatenation (CONCAT) layer; and
   a flattening (FLATTEN) layer.

5. The method of claim 1, further comprising:
   a subsequent adjacent layer further reading needed data which is from other feature maps from the off-chip memory,
   wherein the subsequent adjacent layer is a subsequent layer of the at least two adjacent layers.

6. The method of claim 1, further comprising:
   a subsequent adjacent layer further reading needed data which is from other feature maps from the off-chip memory,
   wherein the subsequent adjacent layer is an element-wise add (ELTWISE) layer.

7. The method of claim 1, further comprising:
   directly merging operation of a subsequent layer into a previous layer, wherein the subsequent layer is a BatchNorm layer and a Scale layer, and the previous layer is a CONV layer.

8. The method of claim 1, further comprising:
   decomposing a layer with a plurality of previous horizontally side-by-side input feature maps; and
   merging the layers obtained after the decomposition into respective input branches.

9. The method of claim 8, wherein the decomposed layer is a POOL layer on a trunk having branch inputs.

10. A method to optimize a neural network computational graph based on rules, comprising:
    making preset rules according to the method of claim 1;
    searching a topology conforming to the preset rules in the neural network computational graph and reconstructing the computational graph.

11. A computational platform for a neural network, comprising:
    a data processing module, used to carry out preset calculation processing for input data and generate output data;
    a data storage module, used to cache input data needed by the data processing module or intermediate data outputted by the data processing module; and
    a control module, controlling the data processing module and the data storage module to execute neural network calculation based on a computational graph optimized by the method of claim 1.

12. A non-transitory machine-readable storage medium, wherein an executable code is stored thereon; wherein when the executable code is executed by a processor of an electronic device, the processor executes the method of claim 1.

* * * * *